United States Patent
Khaled et al.

(10) Patent No.: US 11,555,434 B1
(45) Date of Patent: Jan. 17, 2023

(54) EXHAUST GAS TREATMENT BY THERMAL DIFFUSION

(71) Applicant: SAUDI ARABIAN OIL COMPANY, Dhahran (SA)

(72) Inventors: Fethi Khaled, Al-Khobar (SA); Christos Kalamaras, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/499,549

(22) Filed: Oct. 12, 2021

(51) Int. Cl.
*F01N 3/00* (2006.01)
*F01N 3/26* (2006.01)
*F28F 3/02* (2006.01)
*F01N 3/20* (2006.01)
*F01N 3/02* (2006.01)
(Continued)

(52) U.S. Cl.
CPC ............. *F01N 3/26* (2013.01); *B01D 17/005* (2013.01); *B01D 53/22* (2013.01); *F01N 3/0205* (2013.01); *F01N 3/2006* (2013.01); *F28F 3/027* (2013.01); *B01D 2053/221* (2013.01); *B01D 2258/00* (2013.01); *F28F 2250/102* (2013.01)

(58) Field of Classification Search
CPC ........ F01N 3/26; F01N 3/0205; F01N 3/2006; B01D 17/005; B01D 53/22; B01D 2053/221; B01D 2258/00; B01D 2250/102; B01D 2053/222; B01D 2053/223; B01D 2053/224; B01D 53/225; F28F 3/027; F28F 2250/102
See application file for complete search history.

(56) References Cited

U.S. PATENT DOCUMENTS 2,968,403 A   1/1961   Abelson
5,548,907 A * 8/1996   Gourdine .............. F23D 11/103
                                              34/448

(Continued)

FOREIGN PATENT DOCUMENTS

DE   876537 C   * 10/1949
DE   876 537 C   5/1953

OTHER PUBLICATIONS

Saiki, Takumi et al., "Separation of a binary gas mixture by thermal diffusion in a two-dimensional cascade of many small cavities"; International Journal of Heat and Mass Transfer; vol. 163, Article 120394; pp. 1-6; Dec. 2020 (6 pages).

*Primary Examiner* — Matthew T Largi
(74) *Attorney, Agent, or Firm* — Osha Bergman Watanabe & Burton LLP (57) ABSTRACT

A thermal diffusion unit is fluidly connected to a combustion engine via a flue line. The thermal diffusion unit has a plurality of plates assembled in a parallel configuration, including a pair of heating plates having a heating fluid gap extending therebetween and a pair of cooling plates having a cooling fluid gap extending therebetween. A diffusion sheet is positioned between the pair of heating plates and the pair of cooling plates, such that the diffusion sheet interfaces on a first side with one of the heating plates and interfaces on an opposite side with one of the cooling plates. The diffusion sheet includes a plurality of interconnected thermal diffusion cells arranged in a repeating pattern, at least one heated passage fluidly connecting adjacent thermal diffusion cells, and at least one cooled passage fluidly connecting adjacent thermal diffusion cells.

20 Claims, 7 Drawing Sheets

(51) Int. Cl.
*B01D 17/00* (2006.01)
*B01D 53/22* (2006.01)

(56) References Cited

U.S. PATENT DOCUMENTS

| | | | | |
|---|---|---|---|---|
| 6,010,614 A | * | 1/2000 | Keskar | B01J 19/2475 |
| | | | | 429/513 |
| 2014/0352534 A1 | * | 12/2014 | Sano | B01D 71/64 |
| | | | | 427/244 |
| 2017/0333834 A1 | * | 11/2017 | Worsley | B01D 53/228 |

* cited by examiner

EXHAUST GAS TREATMENT BY THERMAL DIFFUSION

BACKGROUND

Carbon dioxide ($CO_2$) and other pollutants such as nitrogen oxides ($NO_x$) (e.g., (NO), nitrogen dioxide ($NO_2$), and other compounds of nitrogen and oxygen) and sulphur oxides ($SO_x$) (e.g., sulfur dioxide ($SO_2$), sulfur trioxide ($SO_3$), and other compounds of sulphur and oxygen) create challenges for sustainable and safe use of hydrocarbons in the world energy portfolio and especially in the transportation sector. For example, about one fourth of the global greenhouse gas emissions come from the transportation sector. Goals in reducing greenhouse gas emissions have been starting to influence new emission regulations leading to new technological and cost challenges for the use of fuel combustion in powering transportation vehicles. For example, regulations have been implemented to control exhaust gas emissions from tailpipes, which call for pollutant emission reduction from vehicles.

Pollutant emission control from vehicles has often been approached by designing cleaner burning fuels for vehicles. For example, lead has been removed and sulfur levels have been reduced in fuels for vehicles to lower pollutant emissions. Other attempts for reducing emission pollutants have included using mobile carbon capture strategies, which use porous solid adsorbents to adsorb and capture carbon from emission gases.

Gas separation has been proposed using different techniques, such as thermal diffusion, mass diffusion, cryogenic separation, pressure/temperature swing absorption/adsorption. For example, a previous method using thermal diffusion was studied to determine the effects of thermal diffusion between two plates using a cascade structure of microcavities. However, such method was only considered for separation of two binary gases, $CO_2$ and hydrogen gas ($H_2$).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to systems that include a combustion engine and a thermal diffusion unit fluidly connected to the combustion engine via a flue line. The thermal diffusion unit may include a plurality of plates assembled in a parallel configuration, where the plates include a pair of heating plates having a heating fluid gap extending between the pair of heating plates and a pair of cooling plates having a cooling fluid gap extending between the pair of cooling plates. A diffusion sheet may be positioned between the pair of heating plates and the pair of cooling plates, wherein the diffusion sheet interfaces on a first side with one of the heating plates and interfaces on an opposite side with one of the cooling plates. The diffusion sheet may include a plurality of interconnected thermal diffusion cells arranged in a repeating pattern, wherein the thermal diffusion cells are defined by a plurality of shared walls, at least one heated passage fluidly connecting adjacent thermal diffusion cells, and at least one cooled passage fluidly connecting adjacent thermal diffusion cells.

In another aspect, embodiments disclosed herein relate to systems that include a combustion engine and a thermal diffusion unit fluidly connected to the combustion engine via a flue line. The thermal diffusion unit may include a heating wall, a cooling wall, a plurality of thermal diffusion cells defined between the heating wall and the cooling wall, multiple heated passages formed through and fluidly connecting a first set of the thermal diffusion cells, wherein the heated passages are adjacent the heating wall, and multiple cooled passages formed through and fluidly connecting a second set of the thermal diffusion cells, wherein the cooled passages are adjacent the cooling wall. At least one of the thermal diffusion cells in the first set may be the same as at least one of the thermal diffusion cells in the second set, and at least one of the thermal diffusion cells in the first set may be separate from at least one of the thermal diffusion cells in the second set, such that a heated fluid flowing through the first set of thermal diffusion cells is separated from a cooled fluid flowing through the second set of thermal diffusion cells.

In yet another aspect, embodiments disclosed herein relate to a method for reducing carbon from a combustion exhaust gas that includes thermally diffusing the combustion exhaust gas into a carbon rich gas and a carbon poor gas. Thermally diffusing a combustion exhaust gas may include heating a heating plate interfacing a first side of a diffusion sheet in a thermal diffusion unit, cooling a cooling plate interfacing an opposite side of the diffusion sheet, and directing the combustion exhaust gas through the diffusion sheet, wherein the diffusion sheet has multiple thermal diffusion cells that are fluidly connected via a plurality of heated passages formed adjacent to the interfacing heating plate and via a plurality of cooled passaged formed adjacent to the interfacing cooling plate, and wherein one of the carbon rich gas or the carbon poor gas of the combustion exhaust gas flows through the heated passages, and the other of the carbon rich gas or the carbon poor gas flows through the cooled passages. The carbon rich gas may be directed from an outlet of the diffusion sheet through a first flowline, and the carbon poor gas may be directed from the outlet of the diffusion sheet through a second flowline.

Other aspects and advantages of the claimed subject matter will be apparent from the following description and the appended claims.

DETAILED DESCRIPTION

Embodiments disclosed herein may generally relate to separation of multiple exhaust gas components using thermal diffusion. Thermal diffusion refers to the relative motion, or diffusion, of components in a fluid mixture (e.g., gas or liquid) that occurs under the influence of a temperature gradient. Systems and methods disclosed herein may utilize the concept of thermal diffusion to separate multiple components (e.g., two or more components) in an exhaust gas from a combustion engine in order to reduce carbon emissions or other pollutants from being released into the environment. For example, in some embodiments, exhaust gas separation processes may include use of a thermal diffusion unit that separates carbon dioxide ($CO_2$) and at least one other gas pollutant from combustion exhaust gases.

According to embodiments of the present disclosure, one or more thermal diffusion units may be used with one or more combustion engines, where exhaust gas generated by the combustion engine(s) may be sent to the thermal diffusion unit(s) for separating the combustion exhaust gas into two or more gas components.

Figure 1:
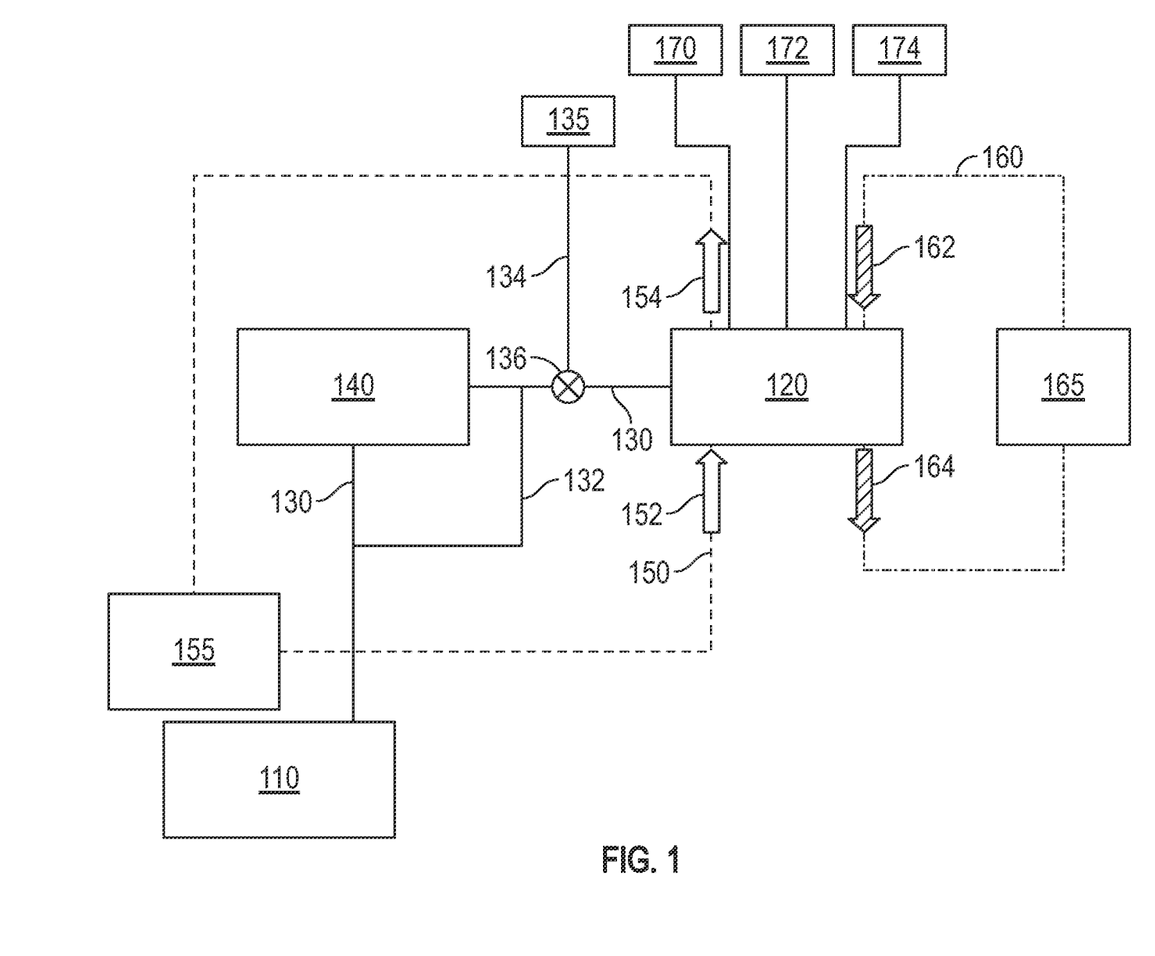
FIG. 1 shows a system for simultaneous removal of pollutant gases from the exhaust stream of a combustion process according to embodiments of the present disclosure.

FIG. 1 shows an example of a system 100 according to embodiments of the present disclosure that includes a combustion engine 110 and a thermal diffusion unit 120. An exhaust port of the combustion engine 110 may be fluidly connected to an inlet of the thermal diffusion unit 120 via one or more flue lines 130, 132. For example, in the embodiment shown, a primary flue line 130 may extend from the combustion engine 110 to the thermal diffusion unit 120, where one or more exhaust gas treatment systems 140 may be provided along the primary flue line 130. A bypass flue line 132 may be fluidly connected to the primary flue line 130 on opposite sides of the exhaust gas treatment system(s) 140 to allow for combustion exhaust gas to bypass the exhaust gas treatment system(s) 140 when selected. According to embodiments of the present disclosure, one or more valves may be operated to close off the bypass line 132 and direct a fluid through the primary flue line 130 and exhaust gas treatment system 140. In some embodiments, one or more valves may be operated to close off the exhaust gas treatment system 140 and direct a fluid through the bypass flue line 132.

In some embodiments, a second bypass line 134 may be fluidly connected to the primary flue line 130 between the exhaust treatment system 140 and the thermal diffusion unit 120 and may extend directly to an exhaust 135. Gas may be flowed from the exhaust treatment system 140 to the exhaust 135 via second bypass line 134 to completely bypass the thermal diffusion unit 120. Additionally, the flow rate through the second bypass line 134 may be controlled, which may allow for the control of the flow rate of the gas entering the thermal diffusion unit 120. For example, if the gas flow through the primary flue line 130 to the thermal diffusion unit 120 is closed and the second bypass line 134 is open, then all gas flow exiting the combustion engine 110 may be directed through the second bypass line 134 to the exhaust 135. In this case, the thermal diffusion unit 120 may be completely bypassed. If the second bypass line 134 is partially closed and the primary flue line 130 is partially opened, e.g., by using a controllable flow splitter 136 or valve at the junction of the primary flue line 130 and the second bypass line 134, some gas may flow to the thermal diffusion unit 120 via the primary flue line 130, and some gas may flow through the second bypass line 134 to exit the exhaust 135. In such manner, the flow rate through the thermal diffusion unit 120 may be controlled.

Exhaust gas treatment systems 140 may include, for example, sulfur oxide ($SO_x$) scrubbers (e.g., wet $SO_x$ scrubbers and dry $SO_x$ scrubbers) and nitrogen oxide ($NO_x$) reducing devices (e.g., selective catalytic reduction (SCR) and exhaust gas recirculation (EGR)). Exhaust gas treatment systems 140 that include injection of one or more additive (e.g., urea, catalysts, or others) to pretreat the exhaust gas may include an additive source, such as a container holding the additive(s) and an injection mechanism (e.g., a pump, a valve that is operable to allow selective flow via gravity, or a spray nozzle). For example, an exhaust gas treatment system 140 may be a catalytic convertor to oxidize exhaust gases. In this case, pollutants in the combustion stream may be partially or totally oxidized at the catalytic converter before reaching the thermal diffusion unit 120. When exhaust gases are flowed through a catalytic convertor, the pollutant gases in the exhaust stream that reach the thermal diffusion unit 120 may be predominately $CO_2$. This may reduce the risk of contamination or corrosion and blockage in the thermal diffusion unit 120 internal flow paths due to the presence of corrosive/contaminant forms of pollutants such as molecular hydrocarbons, nitric oxides ($NO_x$) and sulfur oxides ($SO_x$). Thus, when using a catalytic convertor or other exhaust gas treatment system 140 to pretreat gases flowing into a thermal diffusion unit 120, the material and size choices of the thermal diffusion unit 120 may be simpler and less constrained.

Pretreated or untreated combustion exhaust gas may be directed to an inlet of the thermal diffusion unit 120, where the exhaust gas may be pumped through the thermal diffusion unit 120 at a flow rate. The flow rate of the exhaust gas through the diffusion unit 120 may be based on the exhaust gas output rate from the combustion engine 110 and the size of the thermal diffusion unit. In some embodiments, a pump may be provided along a flue line (e.g., 130, 132) to pump the exhaust gas through the thermal diffusion unit at a selected flow rate, for example, depending on the pump type and pump speed, the desired gas component separation quality, and the size of the thermal diffusion unit.

According to embodiments of the present disclosure, a thermal diffusion unit may have a series of thermal diffusion cells that are interconnected together via one or more heated passages and one or more cooled passages. As used herein, a thermal diffusion cell may refer to a generally enclosed interior space defined by at least one wall and having one or more heated passages and one or more cooled passages formed through the wall(s). In some embodiments, multiple thermal diffusion cells may be interconnected via the heated and cooled passages, where adjacent thermal diffusion cells may share at least a portion of a wall. When a temperature gradient is applied across a thermal diffusion cell, multiple (e.g., three or more) components of a fluid within the thermal diffusion cell may begin to concentrate on different sides of the temperature gradient, thereby resulting in separation of the fluid components. Multiple thermal diffusion cells may be interconnected together via the heated and cooled passages to compound the separation effect of each individual thermal diffusion cell, thereby creating a larger separation effect using the thermal diffusion unit 120.

For example, a temperature gradient may be applied across the thermal diffusion unit 120, where heated passages between multiple thermal diffusion cells may be provided along a high temperature side of the thermal diffusion unit 120, and where cooled passages between the thermal diffusion cells may be provided along a low temperature side of the thermal diffusion unit 120. As exhaust gas is flowed through the thermal diffusion unit 120, the temperature gradient may separate two or more components in the exhaust gas, such that the concentrations of exhaust gas components become different in regions of increased and decreased temperatures in each thermal diffusion cell. Additionally, as the flow of exhaust gas through the thermal diffusion unit continues, increased concentrations of one or more heated gas components may flow through the heated passages, while increased concentrations of one or more cooled gas components may flow through the cooled passages. In such manner, separated gas components from an exhaust gas may be flowed through different passages formed through the thermal diffusion unit and ultimately accumulated into different flow streams of the separated gas components 170, 172, 174.

As used herein, the terms "heated" and "cooled" may be used to describe regions of relative higher and lower temperatures, respectively, in a temperature gradient. For example, a temperature gradient may be provided across a thermal diffusion unit by heating one side of the thermal diffusion unit, while an opposite side of the thermal diffusion unit may have no external temperature change imposed. In such embodiments, regions proximate the side of the thermal diffusion unit with heat applied may be described as "heated," while regions proximate the opposite side may be referred to as "cooled." In other embodiments, a temperature gradient may be provided across a thermal diffusion unit by cooling one side of the thermal diffusion unit, while an opposite side of the thermal diffusion unit may have no external temperature change imposed. In such embodiments, regions proximate the side of the thermal diffusion unit that is cooled by an external source may be described as "cooled," while regions proximate the opposite side may be referred to as "heated," even though the opposite side is not being actively heated. In yet other embodiments, a temperature gradient may be provided across a thermal diffusion unit by heating one side of the thermal diffusion unit and cooling an opposite side of the thermal diffusion unit.

For example, in the embodiment shown in FIG. 1, the thermal diffusion unit 120 may have a heating fluid 150 directed through the thermal diffusion unit 120 to heat one side of the thermal diffusion cells therein and a cooling fluid 160 directed through the thermal diffusion unit 120 to cool an opposite side of the thermal diffusion cells therein. The heating fluid 150 may flow from a heating fluid source 155 into the thermal diffusion unit 120 via a heating fluid inlet 152 and out of the thermal diffusion unit 120 via a heating fluid outlet 154. The heating fluid 150 may be circulated in a closed loop (e.g., from the heating fluid source to the thermal diffusion unit and back to the heating fluid source). In some embodiments, the heating fluid source 155 may be heated using heat from the combustion engine 110. For example, the heating fluid source 155 and/or at least a portion of the heating fluid 150 flow line may be positioned adjacent to or proximate to the combustion engine 110, such that heat from combustion within the combustion engine 110 may dissipate to the heating fluid source 155 and/or heating fluid flow line. In such manner, thermal diffusion units according to embodiments of the present disclosure may separate components in a combustion exhaust gas using free heat from the combustion, and thus may provide more energy efficient and affordable thermal separation of combustion exhaust gas components.

The cooling fluid 160 may flow from a cooling fluid source 165 into the thermal diffusion unit 120 via a cooling fluid inlet 162 and out of the thermal diffusion unit 120 via a cooling fluid outlet 164. The cooling fluid 160 may be, for example, engine coolant or relatively cool air that may be circulated through the system.

According to embodiments of the present disclosure, a temperature gradient may be applied to a thermal diffusion unit using different heating and/or cooling mechanisms. For example, in some embodiments, a temperature gradient may be applied by integrating the thermal diffusion unit with a heat exchanger, such as a plate type heat exchanger.

Figure 2A:
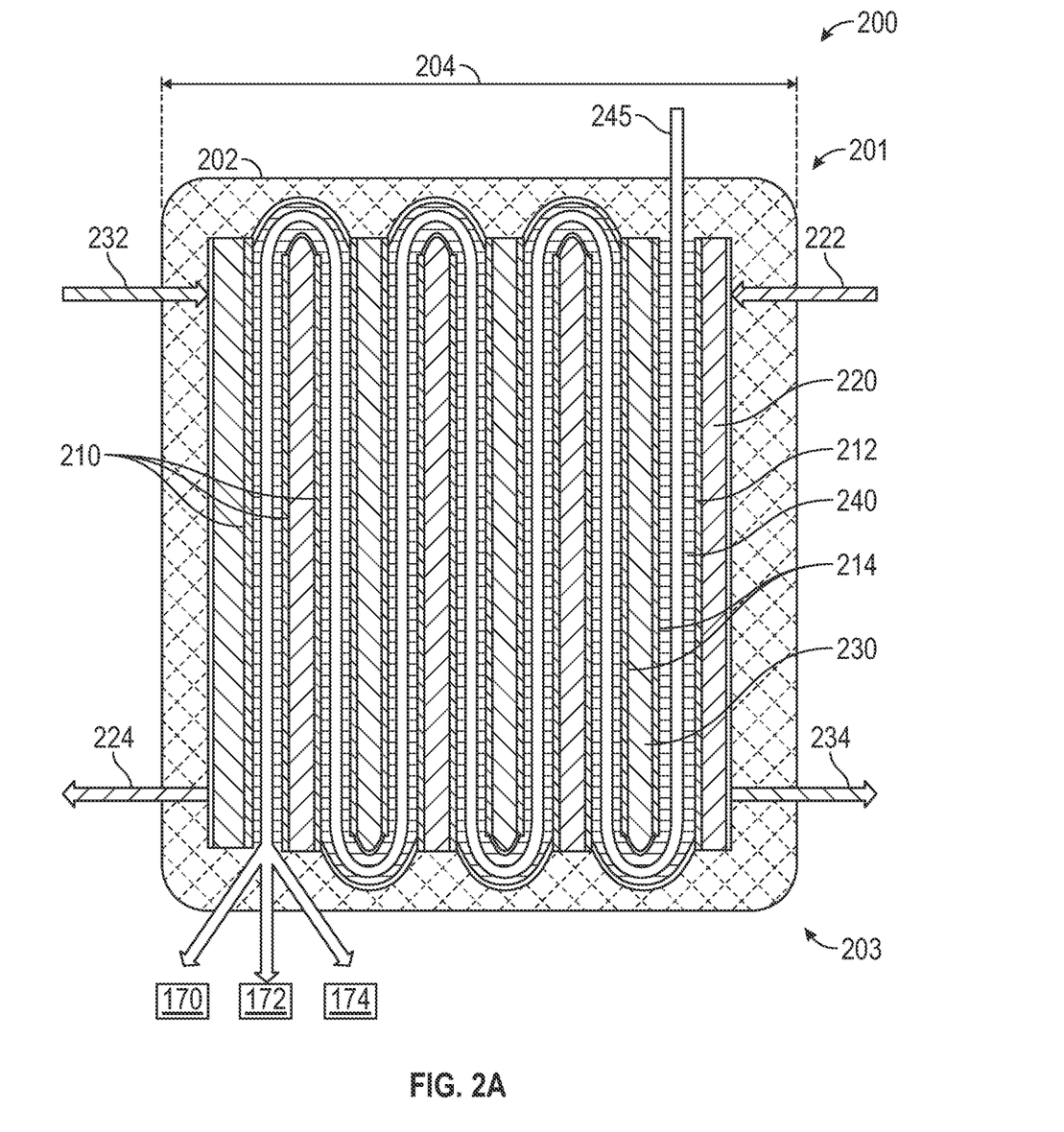
FIG. 2A shows a side view of a three-inlet flow thermal diffusion unit according to embodiments of the present disclosure.
Figure 2B:
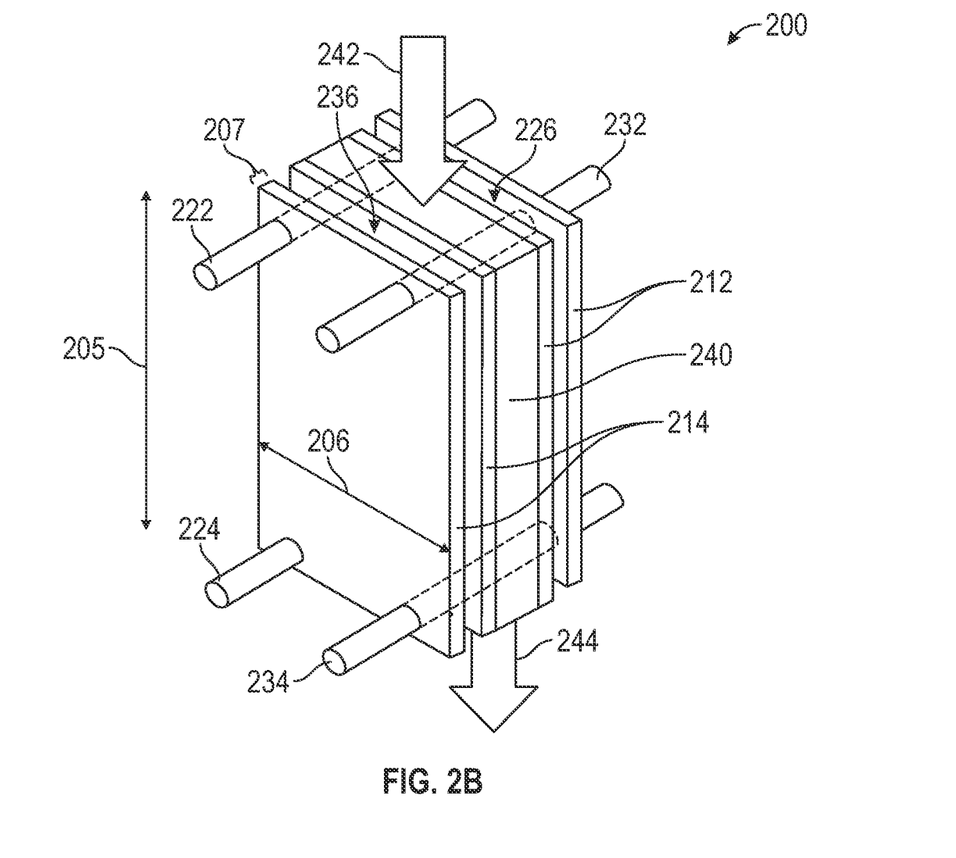
FIG. 2B shows an isometric view of a thermal diffusion unit according to embodiments of the present disclosure.

FIGS. 2A and 2B show a side view and an isometric view, respectively, of thermal diffusion units 200 according to embodiments of the present disclosure having a plate type heat exchanger configuration. The thermal diffusion unit 200 may include a plurality of plates 210 held in a frame 202 in a spaced apart, parallel configuration. A heating fluid 220 may be flowed through selected pairs of the plates 210 to provide pairs of heating plates 212, and a cooling fluid 230 may be flowed through different pairs of the plates 210 to provide pairs of cooling plates 214.

In some embodiments, heating fluid 220 may be provided from a heating fluid source (e.g., 155, FIG. 1). Systems according to embodiments of the present disclosure may have a heating fluid line fluidly connected between a heating fluid source and the thermal diffusion unit 200, where heating fluid 220 may flow from the heating fluid source to heating fluid gaps formed between pairs of heating plates 212. In some embodiments, at least a portion of the heating fluid line and/or the heating fluid source may be positioned adjacent to a portion of the combustion engine system (e.g., proximate the combustion engine or a flue line carrying the expelled combustion exhaust gas). In such embodiments, the heat produced during combustion may be utilized to heat the heating fluid 220. Such embodiments may increase energy efficiency of the system.

In some embodiments, cooling fluid 230 may be provided from a cooling fluid source (e.g., 165, FIG. 1), where one or more cooling fluid lines may fluidly connect the cooling fluid source to the thermal diffusion unit 200. The cooling fluid 230 may flow from the cooling fluid source (e.g., circulating air or a refrigerant source) to cooling fluid gaps formed between pairs of cooling plates 214.

A sheet of interconnected thermal diffusion cells, referred to herein as a diffusion sheet 240, may be positioned between the heating and cooling plates 212, 214, such that each diffusion sheet 240 may interface on one side with a heating plate 212 and on an opposite side with a cooling plate 214. In such manner, the interfacing heating and cooling plates 212, 214 may provide a temperature gradient across the thermal diffusion cells of the diffusion sheet 240.

In the embodiment shown in FIG. 2A, multiple pairs of heating plates 212 and multiple pairs of cooling plates 214 may be alternatingly positioned along a length 204 of the thermal diffusion unit 200, where multiple diffusion sheets 240 are alternatingly positioned between each set of heating and cooling plate pairs. In other embodiments, such as shown in FIG. 2B, a thermal diffusion unit 200 may be made with a single pair of heating plates 212, a single pair of cooling plates 214, and a diffusion sheet 240 positioned therebetween. The number of heating plates and cooling plates used in a thermal diffusion unit may depend on, for example, the overall size of the thermal diffusion unit, the size of the plates 210 and diffusion sheet(s) 240, and the desired separation quality of the gas components being separated. Each plate 210 in a plate type thermal diffusion unit 200 may have a height 205, a width 206, and a thickness 207, where the thickness 207 of each plate and spacing between the assembled plates contribute to the overall length 204 of the thermal diffusion unit 200. Each of the plates 210 in the thermal diffusion unit 200 may have the same shape and size, or in some embodiments, at least one plate 210 in a plate type thermal diffusion unit 200 may have a different shape or size from another plate 210 in the thermal diffusion unit.

Additionally, each of the plates 210 in the thermal diffusion unit 200 may be made of the same material, or in some embodiments, at least one plate may be made of a different material than another plate 210 in a plate type thermal diffusion unit 200. For example, in some embodiments, heating plates 212 may be formed of a material having a higher thermal conductivity than cooling plates 214. According to embodiments of the present disclosure, plates 210 in a plate type thermal diffusion unit 200 may be made of a thermally conductive material, e.g., a metal such as low carbon steel, copper, copper-nickel, stainless steel, or titanium alloys.

Heating fluid 220 may be flowed through the pairs of heating plates 212 using a single shared inlet channel 222 and a single shared outlet channel 224, or through individual inlets and outlets to each pair of heating plates 212. For example, as shown in FIGS. 2A and 2B, heating fluid 220 may be directed to a heating fluid inlet channel 222 at an initial heated temperature ($T_{hot}$). The heating fluid 220 may be flowed between pairs of heating plates 212 via a shared heating fluid inlet channel 222 extending along the length 204 of the thermal diffusion unit 200 through a first end 201 of the assembled plates and via a shared heating fluid outlet channel 224 extending through a second end 203 of the assembled plates 210. The heating fluid outlet channel 224 may be in fluid communication with the heating fluid inlet channel 222 via a heating fluid gap 226 formed between each pair of heating plates 212, such that heating fluid 220 may flow from the inlet channel 222 at the first end 201 of the heating plates 212 to the outlet channel 224 at the second end 203 of the heating plates 212 via the heating fluid gap 226. As the heating fluid 220 flows through the heating fluid gap 226, the heating fluid 220 may heat the heating plates 212, thereby providing a relatively high temperature for a temperature gradient across an adjacent diffusion sheet 240. The heating fluid may exit the heating fluid outlet channel 224 at an outlet heated temperature ($T_{h,\ out}$), which may be lower than the initial heated temperature ($T_{hot}$) due to dissipation of some of the heat to the heating plates 212.

Likewise, cooling fluid 230 may be flowed into a cooling fluid inlet channel 232 extending along the length 204 of the thermal diffusion unit 200 through the first end 201 of the assembled plates, through cooling fluid gaps 236 formed between each pair of cooling plates 214, and out a cooling fluid outlet channel 234 extending through the second end 203 of the assembled plates 210. In such manner, the cooling fluid outlet channel 234 may be in fluid communication with the cooling fluid inlet channel 232 via the cooling fluid gap 236. As the cooling fluid 230 flows through the cooling fluid gap 236, the cooling fluid 230 may cool the cooling plates 214, thereby providing a relatively low temperature for the temperature gradient across an adjacent diffusion sheet 240. The cooling fluid 230 may be directed to the cooling fluid inlet channel 232 at an initial cooled temperature ($T_{cold}$) and may exit the cooling fluid outlet channel 234 at an outlet cooled temperature ($T_{c,\ out}$) greater than the initial cooled temperature ($T_{cold}$) due to dissipation of heat into the cooling fluid 230 as it flows between the cooling plates 214.

Gaskets (not shown) may be provided in selected locations within the gaps 226, 236 formed between pairs of heating plates 212 and pairs of cooling plates 214 to either seal off access of a channel 222, 224, 232, 234, or to allow fluid flow into the gaps 226, 236.

For example, a sealing gasket may be provided between a pair of cooling plates 214, where the sealing gasket may extend around the entire circumference of heating fluid inlet channel formed through the cooling plates 214. In such manner, heating fluid 220 flowing through the heating fluid inlet channel 222 may be restrained to the volume sealed by the sealing gasket while crossing through the cooling plates 214. In other words, heating fluid 220 may flow through the heating fluid inlet channel 222 and through the cooling plates 214 without flowing along the cooling fluid gap 236. Similarly, a sealing gasket may be provided between a pair of heating plates 212, where the sealing gasket may extend around the entire circumference of cooling fluid inlet channel 232 formed through the heating plates 212. In such manner, cooling fluid 230 flowing through the cooling fluid inlet channel 232 may be restrained to the volume sealed by the sealing gasket while crossing through the heating plates 212. Sealing gaskets may also be provided around the heating fluid outlet channel 224 between pairs of cooling plates 214 to prevent heating fluid 220 from getting into the cooling fluid gap 236, and around the cooling fluid outlet channel 234 between pairs of heating plates 212 to prevent cooling fluid 230 from getting into the heating fluid gap 226.

Open gaskets may be provided between pairs of plates according to the type of fluid to be directed through the gap between the pairs of plates. For example, an open gasket may be provided between a pair of heating plates 212 around a heating fluid inlet channel 222 and outlet channel 224, where the open gasket may seal the heating fluid 220 from escaping the thermal diffusion unit while also allowing the heating fluid 220 to flow from the heating fluid inlet channel 222, through the heating fluid gap 226, and into the heating fluid outlet channel 224. Likewise, an open gasket may be provided between a pair of cooling plates 214 around a cooling fluid inlet channel 232 and outlet channel 234, where the open gasket may seal the cooling fluid 230 from escaping the thermal diffusion unit while also allowing the cooling fluid 230 to flow from the cooling fluid inlet channel 232, through the heating fluid gap 236, and into the heating fluid outlet channel 234.

According to embodiments of the present disclosure heating fluid gaps 226 and cooling fluid gaps 236 may extend along a majority of the surface area between pairs of plates (e.g., along a majority of the height 205 and/or along a majority of the width 206). By flowing a heating fluid 220 or a cooling fluid 230 flow across a majority of a plate's surface area, the plate 210 may be more effectively heated (with heating fluid 220) or cooled (with cooling fluid 230).

As described above, a diffusion sheet 240 may be positioned between a pair of heating plates 212 and a pair of cooling plates 214, such that the diffusion sheet 240 interfaces on a first side with one of the heating plates 212 and interfaces on an opposite side with one of the cooling plates 214. The diffusion sheet 240 may be made of a plurality of thermal diffusion cells that are interconnected via at least one heated passage and at least one cooled passage. A combustion exhaust gas 245 may be directed (e.g., via a conduit) into an inlet end 242 of the diffusion sheet 240, where the gas 245 may flow through the heated and cooled passages of the thermal diffusion cells until ultimately exiting the an outlet end 244 of the diffusion sheet 240. As the gas 245 flows through the diffusion sheet 240, components of the combustion exhaust gas 245 may be concentrated to a heated or cooled region of the thermal diffusion cells by the effects of a temperature gradient applied from the neighboring heating and cooling plates 212, 214. The concentrated components in the heated regions may flow through the heated passage(s) in a separated manner from the concentrated components in the cooled regions flowing through the cooled passage(s).

As shown in FIG. 2A, multiple diffusion sheets 240 may be used to form a thermal diffusion unit 200, where each diffusion sheet 240 may be positioned between alternating pairs of heating plates 212 and cooling plates 214. In such embodiments, the outlet end 244 of a first diffusion sheet 240 may be fluidly connected to the inlet end 242 of a second diffusion sheet, the outlet end 244 of the second diffusion sheet 240 may be fluidly connected to the inlet end 242 of a third diffusion sheet 240, and so forth, until the separated components of the combustion exhaust gas 245 ultimately exits the outlet end of the last diffusion sheet 240 in the thermal diffusion unit 200.

Gas flowed from the outlet end 244 of one diffusion sheet 240 to the inlet end of a subsequent diffusion sheet may be flowed through one or more connecting conduits. In some embodiments, the gas exiting one diffusion sheet outlet 244 may be directed to a subsequent diffusion sheet inlet 242 through a continuum connection between the heated passages and between the cooled passages in the diffusion cells of the thermal diffusion sheets, where the outlet 244 of one diffusion sheet 240 and the inlet 242 of the subsequent diffusion sheet 240 may be on the same side (e.g., on the first end 201 or on the second end 203) of the thermal diffusion unit 200. This arrangement may be provided, for example, by forming a very long single diffusion sheet that is folded multiple times to fit inside the thermal diffusion unit 200, where the folds may have a large enough radius of curvature to prevent blockage of the heated passages or the cooled passages through the thermal diffusion sheet.

According to embodiments of the present disclosure, a combustion exhaust gas 245 may be flowed through a diffusion sheet 240 in a thermal diffusion unit 200, where the combustion exhaust gas may enter the inlet end 242 of the diffusion sheet 240 as a single stream of gas and may exit the outlet end 244 of the diffusion sheet 240 as separated flows 170, 172, 174 of different gas component concentrations.

Figure 3:
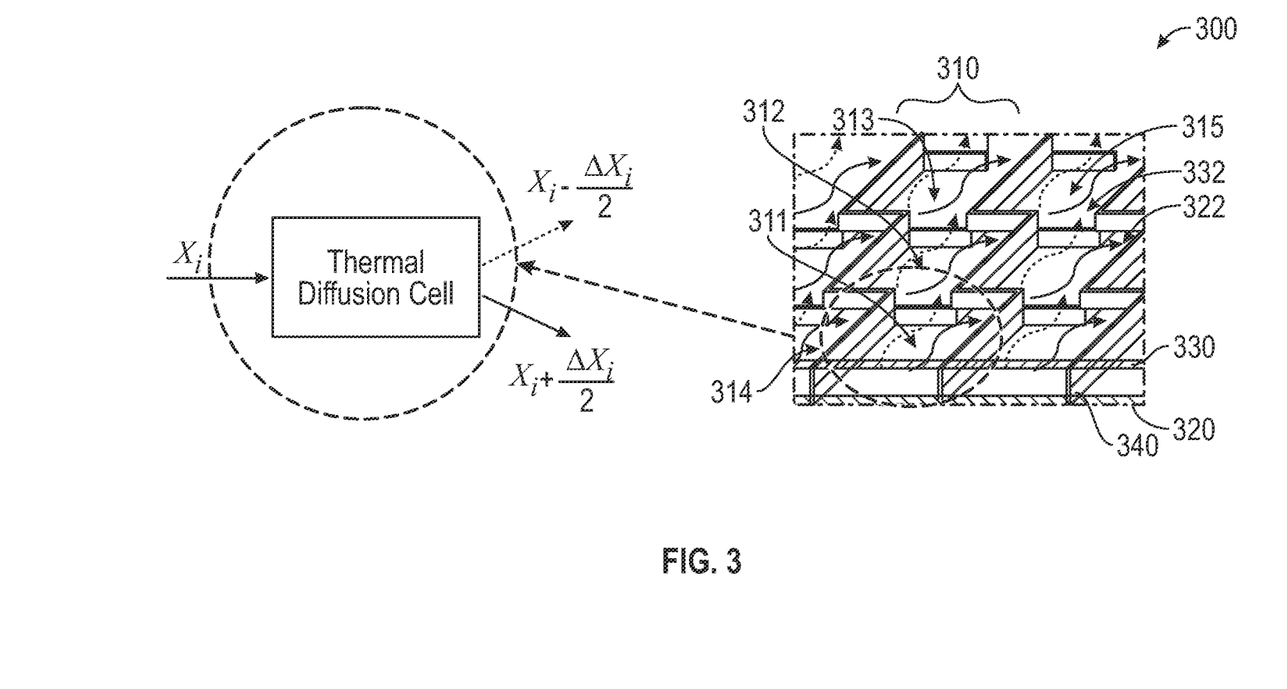
FIG. 3 shows a thermal diffusion amplification cascade structure according to embodiments of the present disclosure.

FIG. 3 shows, in more detail, an example of a diffusion system 300 according to embodiments of the present disclosure using a temperature gradient applied across multiple interconnected thermal diffusion cells 310. The thermal diffusion cells 310 may be provided in a sheet configuration, such as shown in FIGS. 2A and 2B, in a tubular configuration, or other overall shape. The thermal diffusion cells 310 may include a plurality of shared walls 340 extending a height between a cooling wall 320 and a heating wall 330 to define the interior volume of the thermal diffusion cells 310. The thermal diffusion cells 310 may also include at least one heated passage 332 formed adjacent to the heating wall 330 and at least one cooled passage 322 formed adjacent to the cooling wall 320, where the heated passage(s) and cooled passage(s) fluidly connect adjacent thermal diffusion cells 310.

In the embodiment shown, multiple heated passages 332 may be formed through and fluidly connect a first set of the thermal diffusion cells (e.g., cells 311, 312, and 313), and multiple cooled passages 322 may be formed through and fluidly connect a second set of the thermal diffusion cells (e.g., cells 312, 314, and 315), where at least one of the thermal diffusion cells in the first set may be the same as at least one of the thermal diffusion cells in the second set (e.g., cell 312), and where at least one of the thermal diffusion cells in the first set may be separate from at least one of the thermal diffusion cells in the second set (e.g., cells 311, 313, 314, and 315). A design of multiple thermal diffusion cells having multiple flow paths directed from one thermal diffusion cell to two different thermal diffusion cells may be referred to herein as a "cascade" design.

By using a cascade design, where the heated and cooled passages direct one or more heated components and one or more cooled components, respectively, to different thermal diffusion cells, a heated fluid flowing through the first set of thermal diffusion cells may be separated from a cooled fluid flowing through the second set of thermal diffusion cells. In such manner, interconnected thermal diffusion cell design according to embodiments of the present disclosure may amplify the effects of thermal diffusion from individual thermal diffusion cells. As heated and cooled component separation continues through the thermal diffusion cells 310 provided in a larger thermal diffusion unit, the concentrations of separated gas components may be larger, which may be used, for example, to provide overall improved separation of combustion exhaust gas components.

The separation yield of an individual thermal diffusion cell 310 may be quantified by the following separation equation:

$$\Delta x_i = \alpha_i \cdot x_i \cdot (1 - x_i) \cdot \ln\left(\frac{T_{hot}}{T_{cold}}\right) \qquad \text{Eq. 1}$$

Where, $\Delta x_i$ is the concentration difference of gas element i between the upper and lower streams as they exit a thermal diffusion cell, $x_i$ is the concentration of the inlet stream of the cell, $\alpha_i$ is the thermal diffusion factor of element i from the other components of the gas, and ($T_{hot}$, $T_{cold}$) are respectively the temperatures of the heating wall 330 and the cooling wall 320. Amplification of the separation efficiency may occur as the gas advances through a cascade structure of thermal diffusion cells 310. The length and the size of the overall cascade structure of thermal diffusion cells 310 may vary, for example, depending on the flow rate of gas being flowed through the cells and the desired overall separation quality (the concentration range of the separated streams exiting the overall thermal diffusion unit).

For example, a combustion exhaust gas may contain nitrogen ($N_2$), carbon dioxide ($CO_2$), and at least one other component. As the combustion exhaust gas flows through a thermal diffusion unit 200, the carbon dioxide may separate to the cooled passages whereas the nitrogen oxide may separate to the heated passages. In general, heavier gases tend to separate to the cooled passages and lighter gases tend to separate to the heated passages. The separation tendency of the components is a function of the thermal diffusion factor $\alpha_i$ of the gas component i from the other components of the combustion exhaust gas, which is in turn a function of the molecular weight differences between the different gas components.

According to embodiments of the present disclosure, thermal diffusion cells may be arranged together in a repeating pattern to form a thermal diffusion unit (e.g., as a thermal diffusion sheet, such as shown in FIGS. 2A and 2B).

Figure 4:
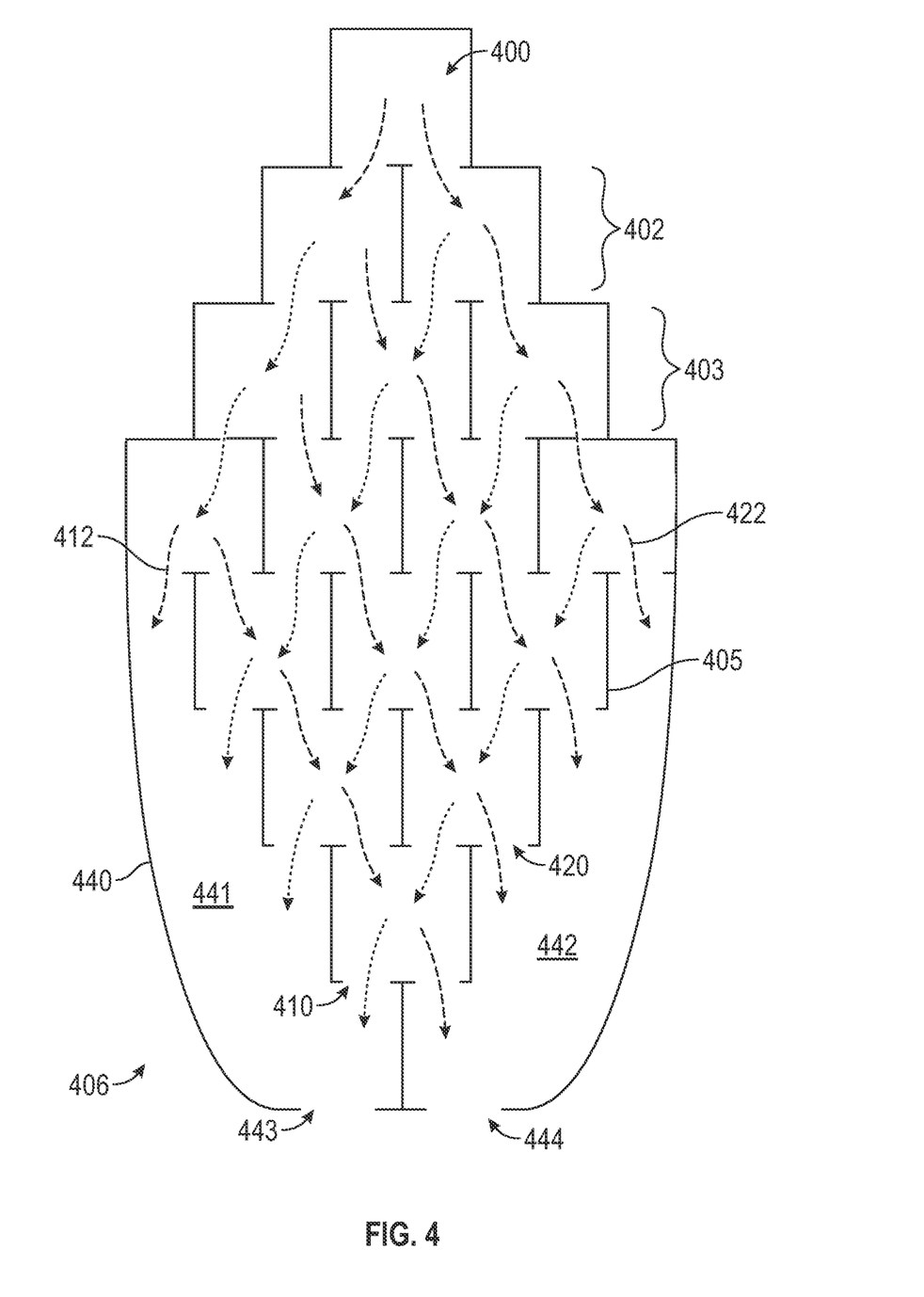
FIG. 4 shows a schematic of a thermal diffusion structure according to embodiments of the present disclosure.

For example, FIG. 4 shows an example of a repeating pattern of thermal diffusion cells 400 defined by a plurality of shared walls 405 and interconnected via heated passages 410 and cooled passages 420. The repeating pattern of the thermal diffusion cells 400 may include multiple rows 402, 403, etc. of thermal diffusion cells 400 that are offset from each other, such that the heated passage 410 of a first thermal diffusion cell in a first row 402 fluidly connects a second thermal diffusion cell in a second row 403, and the cooled passage 420 of the first thermal diffusion cell fluidly connects a third thermal diffusion cell in the second row 403. In such pattern, each thermal diffusion cell 400 may have two fluid outlets (a heated passage 410 and a cooled passage 420), where each fluid outlet fluidly connects to a different thermal diffusion cell 400. Additionally, in the embodiment shown, some thermal diffusion cells 400 may have a single fluid inlet (e.g., a heated passage, a cooled passage, or a passage for unseparated gas), while other thermal diffusion cells 400 may have two fluid inlets (e.g., a heated passage 410 and a cooled passage 420).

As fluid (e.g., a combustion exhaust gas) flows through the diffusion structure, a temperature gradient applied across the thermal diffusion cells 400 may result in one or more components of the fluid concentrating in a relatively warmer region of the cell (e.g., proximate the heated passage) and one or more components of the fluid concentrating in a relatively cooler region of the cell (e.g., proximate the cooled passage). For example, relatively lighter gas components may concentrate in the relatively warmer region of the cell, and relatively heavier gas components may concentrate in the relatively cooler region of the cell. The heated concentrated components 412 may flow through heated passages 410 of multiple thermal diffusion cells 400 until eventually reaching an outlet end 406 of the diffusion structure. As the heated concentrated components 412 flow through multiple thermal diffusion cells 400, the concentration of the heated components may increase. In such manner, the exiting concentration of gas components from the heated passages 410 may be increased from the cascading structure of the interconnected thermal diffusion cells 400. Likewise, the cooled concentrated components 422 may flow through cooled passages 420 of multiple thermal diffusion cells 400 until eventually reaching the outlet end 406 of the diffusion structure. As the cooled concentrated components 422 flow through multiple thermal diffusion cells 400, the concentration of the cooled components may increase to provide a separated stream of the cooled components.

According to embodiments of the present disclosure, a fluid diverter 440 may be connected at the outlet end 406 of the diffusion structure. The fluid diverter 440 may include a first flow path 441 fluidly connected to the heated passages 410 of the thermal diffusion cells 400 at the outlet end 406 of the diffusion structure, and a second flow path 442 fluidly connected to the cooled passages 420 of the thermal diffusion cells 400 at the outlet end 406 of the diffusion structure. The fluid diverter 440 may further include a first outlet 443 to the first flow path 441 and a second outlet 444 to the second flow path 442, whereby the separated fluid components exiting the outlets 443, 444 of the fluid diverter 440 may be directed to another process or disposed of.

Figure 5:
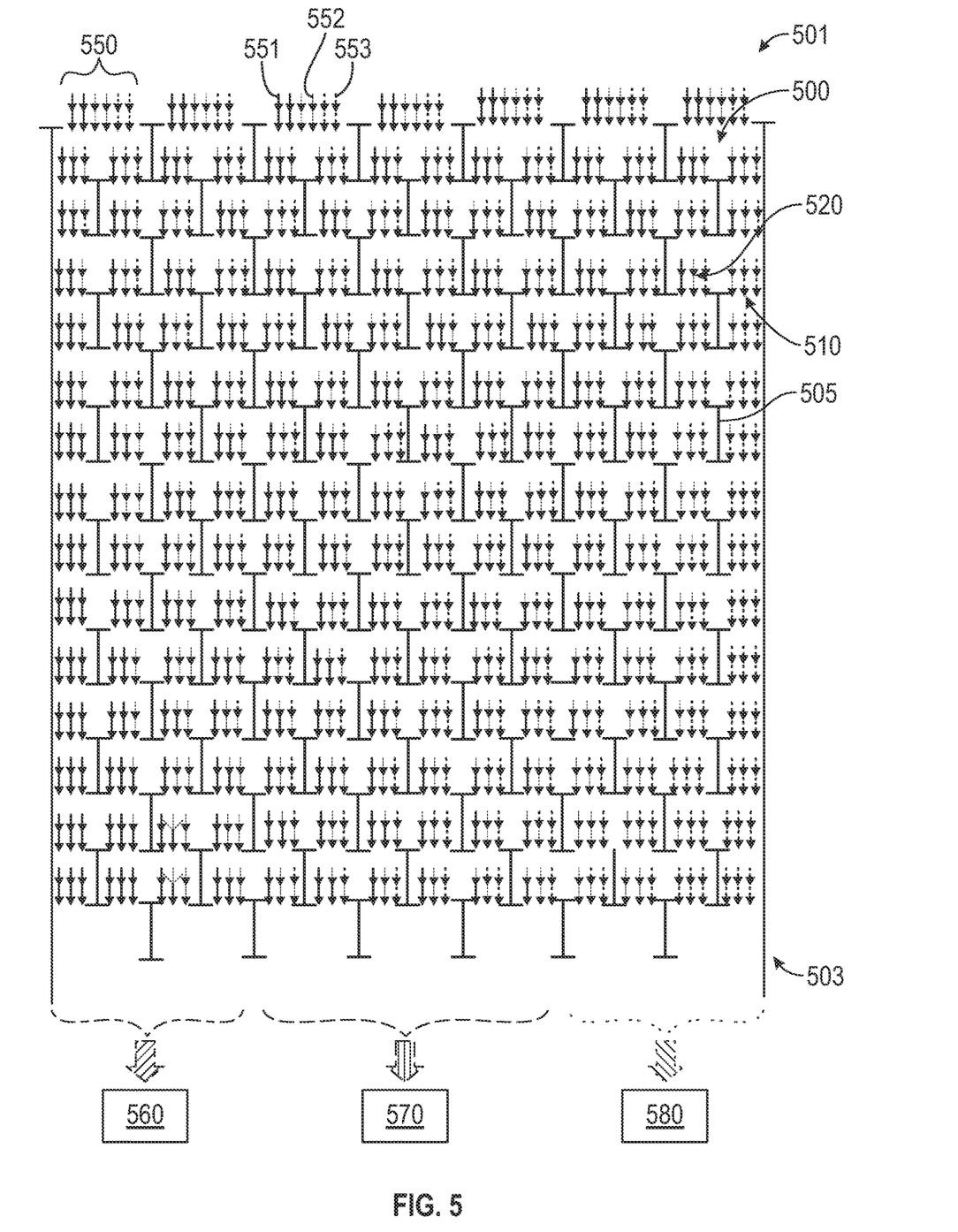
FIG. 5 shows a schematic of a thermal diffusion structure according to embodiments of the present disclosure.

FIG. 5 shows another example of a repeating pattern of thermal diffusion cells 500 defined by a plurality of shared walls 505 and interconnected via heated passages 510 (shown on the right side of each cell 500) and cooled passages 520 (shown on the left side of each cell 500), where the interconnected thermal diffusion cells 500 may form a thermal diffusion unit 501. At an inlet end of the thermal diffusion unit, an incoming initial combustion exhaust gas 550 may include multiple components, including pollutants. For the ease of explanation, the example in FIG. 5 may be described with the initial combustion exhaust gas 550 including a first component 551, a second component 552, and a third component 553. Prior to flowing through the thermal diffusion cells 500, the initial combustion exhaust gas 550 may enter each thermal diffusion cell 500 in the first row of the thermal diffusion unit having the same distribution of components (e.g., 33% by mass of the first component 551, 33% by mass of the second component 552, and 33% by mass of the third component 553). However, other concentrations of components may be provided in an initial combustion exhaust gas.

As the combustion exhaust gas is flowed through the thermal diffusion cells 500, the heavier molecules may migrate to the colder regions of each cell 500, and the lighter molecules may migrate to the hotter regions of each cell 500. As the heated passages 510 are provided in the hotter regions of the cells, and the cooled passages 520 are provided in the colder regions of the cells, the heavier components (e.g., first component 551) of the combustion exhaust gas may flow through the cooled passages 520, while the lighter components (e.g., third component 553) may flow through the heated passages 510. In such manner, as the gas flows through the diffusion cells, gas components may begin to separate into component flow streams having different concentrations of relatively heavier components and relatively lighter components. For example, component flow streams flowing through the heated passages 510 may contain multiple gas components with a relatively higher concentration of the lighter gas components, compared to component flow streams flowing through the cooled passages 520, which may contain multiple gas components with a relatively lower concentration of the same lighter gas components.

The relative differences in component flow stream concentrations may increase as the gas flows to the outlet end 503 of the thermal diffusion unit 501. For example, at the outlet of the thermal diffusion unit 501, the lightest gas component (e.g., third component 553) may be concentrated at the far-right part of the outlet (through heated passages 510), the heaviest gas component (e.g., first component 551) may be concentrated at the far-left part of the outlet (through cooled passages 520), and moderate weight gas components (e.g., second component 552) may be concentrated in the middle of the outlet.

Component flow streams may be collected from different regions of the outlet of the thermal diffusion unit 501, where different components may be concentrated in different component flow streams. For example, in the embodiment shown, a first component flow stream 560 having a relatively higher concentration of the first component 551 may be collected from the far-left part of the outlet, a second component flow stream 570 having a relatively higher concentration of the second component 552 may be collected from the middle part of the outlet, and a third component flow stream 580 having a relatively higher concentration of the third component 553 may be collected from the far-right part of the outlet. In such manner, different gas components (e.g., including different pollutants) may be concentrated and collected at different outlet regions of the outlet in the thermal diffusion unit. Accordingly, thermal diffusion units according to embodiments of the present disclosure may allow for the separation and collection of multiple different components, including three or more different types of components, from a combustion exhaust gas.

Further, the concertation of different gas components exiting each thermal diffusion cell 500 at the outlet 503 may be a function of the size of the thermal diffusion unit and how many thermal diffusion cells 500 are provided. For example, a predicted separation level (indicating a concentration level of a given component from a diffusion cell) may be calculated based on the number of thermal diffusion cells and using the separation equation (Eq. 1) provided above. Additionally, the amount and location of collected component flow streams to be collected at the outlet of the thermal diffusion unit may be selected to provide different concentration levels of components in the collected component flow streams. For example, streams from adjacent thermal diffusion cells 500 along the outlet row of thermal diffusion cells may be grouped into groups of one, two or more adjacent thermal diffusion cells 500 to form a component flow stream. In such manner, a thermal diffusion unit may be designed (e.g., including the number of interconnected thermal diffusion cells and the number of component flow streams collected at the outlet) to provide a preselected separation level of components in a combustion exhaust gas.

For example, in the embodiment shown in FIG. 5, the first component flow stream 560 may have a concentration of the first component 551 of 71% by mass and a concentration of the second component 552 of 29% by mass. The second component flow stream 570 may have a concentration of the first component 551 of 30% by mass, a concentration of the second component 552 of 40% by mass, and a concentration of the third component 553 of 30% by mass. The third component flow stream 580 may have a concentration of the second component of 29% by mass and a concentration of the third component 553 of 71% by mass. By altering the amount of thermal diffusion cells 500 provided in the thermal diffusion unit 501, the concentration levels in the component flow streams may be altered. Alternatively, or additionally, the component flow streams may be segmented at the outlet 503 in a different configuration (e.g., collecting component flow streams from a smaller number or larger number of adjacent thermal diffusion cells 500 at the outlet row) to alter the concentration levels in the component flow streams.

Thermal diffusion structures according to embodiments of the present disclosure may be used for separating components in a fluid, such as a combustion exhaust gas. For example, thermal diffusion structures disclosed herein may be used for separating a pollutant component (e.g., carbon dioxide) from a combustion exhaust gas. The separated pollutant component may then be further processed or disposed of.

Figure 6:
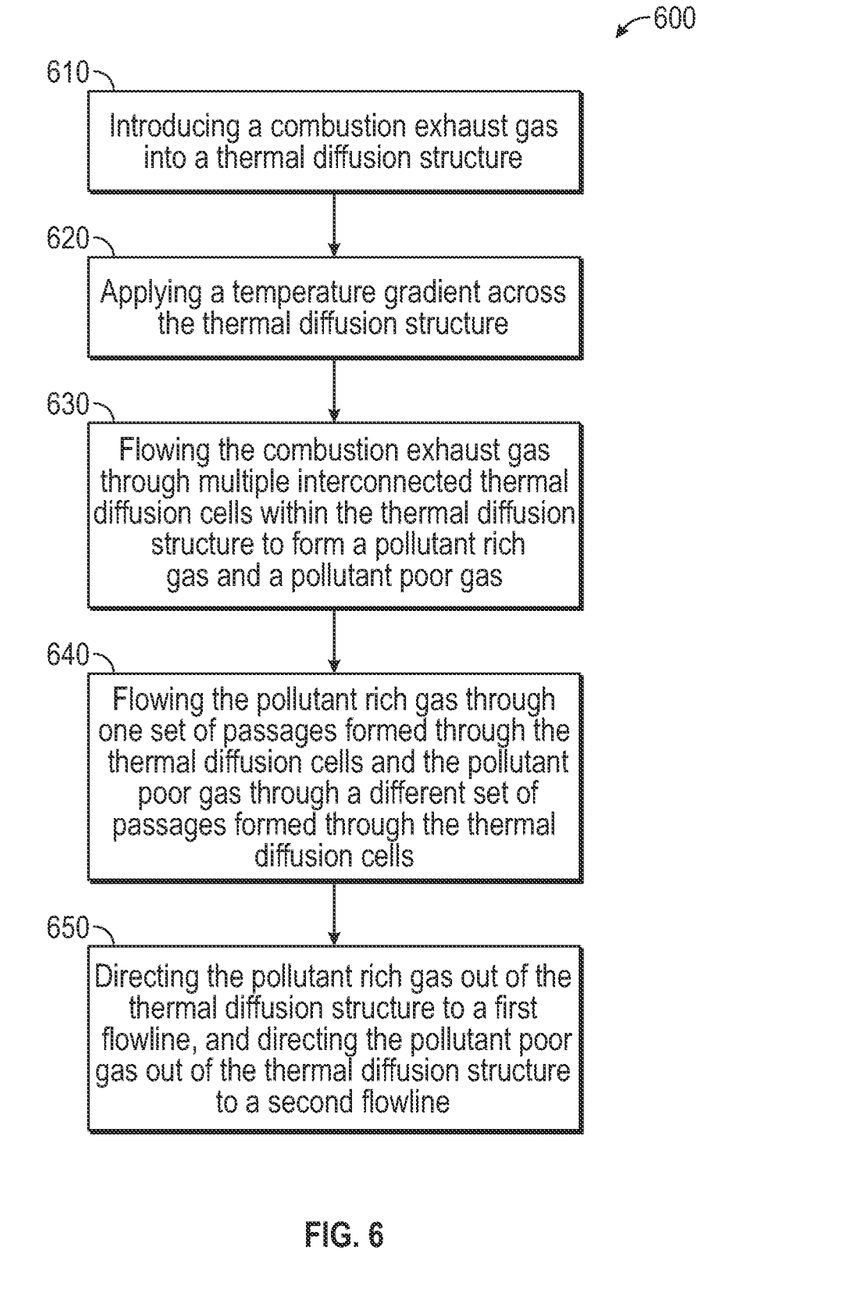
FIG. 6 shows a method according to embodiments of the present disclosure.

FIG. 6 shows an example of a method 600 of using a thermal diffusion unit according to embodiments of the disclosure for reducing pollutant output from a combustion exhaust gas.

A method 600 of reducing a pollutant (e.g., carbon pollutants, $SO_x$, or $NO_x$) from a combustion exhaust gas may include flowing the combustion exhaust gas into a thermal diffusion structure (e.g., a thermal diffusion sheet) according to embodiments of the present disclosure, as shown in step 610, to thermally diffuse the combustion exhaust gas into a pollutant rich gas (e.g., a carbon rich gas) and a pollutant poor gas (e.g., a carbon poor gas). A pollutant rich gas may be considered to be a gas having a concentration of the pollutant that is greater than the concentration of the pollutant in the combustion exhaust gas prior to flowing through the thermal diffusion structure (e.g., a concentration that is 20 percent greater, 50 percent greater, 80 percent greater, or more than the initial pollutant concentration in the combustion exhaust gas). A pollutant poor gas may be considered to be a gas having a concentration of the pollutant that is less than the concentration of the pollutant in the combustion exhaust gas prior to flowing through the thermal diffusion structure (e.g., a concentration ranging between 20 and 80 percent less than the initial pollutant concentration in the combustion exhaust gas). Different sizes and designs of the thermal diffusion structure may be selected to provide different concentrations of a separated pollutant. Increasing the size of the thermal diffusion structure may yield higher separation levels of the gas components (which may theoretically reach up to 100% separation), but higher heating/cooling duty and pumping works used in larger structures may constrain design of the thermal diffusion structure. For thermal diffusion, the constraints of thermal diffusion unit size, of the applied temperature gradient, of the initial concentration of the pollutant in the exhaust gas as well as of the flow rate of the exhaust gas may all contribute to the achievable separation level. Accordingly, a compromise of size, heat duty, pumping power and separation level may be considered when designing the size of the thermal diffusion structure.

As shown in step 620, a temperature gradient may be applied to the thermal diffusion structure by heating a heating plate interfacing a first side of the thermal diffusion structure and/or cooling a cooling plate interfacing an opposite side of the diffusion structure.

While the temperature gradient is applied across the thermal diffusion structure, the combustion exhaust gas may be directed through multiple interconnected thermal diffusion cells in the thermal diffusion structure, as shown in step 630. The thermal diffusion cells may be fluidly connected via a plurality of heated passages formed adjacent to the relatively warmer side of the temperature gradient and via a plurality of cooled passaged formed adjacent to the relatively cooler side of the temperature gradient.

As the gas is flowed through the thermal diffusion cells, the components in the gas may concentrate on different sides of the thermal gradient, forming a gas having an increased concentration of a pollutant and a gas having a decreased concentration of the pollutant. As shown in step 640, the gas having the increased pollutant concentration may flow through either the heated passages or the cooled passages, while the gas having the decreased pollutant concentration may flow through the other of the heated or cooled passages.

The separated gas streams may be directed through an outlet of the diffusion structure to separate flowlines, as shown in step 650. For example, a pollutant (e.g., carbon) rich gas may be directed out of an outlet of the diffusion structure through a first flowline, and a pollutant poor gas may be directed from the outlet of the diffusion structure through a second flowline.

In some embodiments, one or more of the separated gas streams may be directed to a second thermal diffusion structure (e.g., a thermal diffusion sheet). For example, a pollutant poor gas that was separated from a first thermal diffusion structure may be directed to a second thermal diffusion structure for additional separation of the pollutant from the gas.

In some embodiments, a flow rate of the combustion exhaust gas through the diffusion structure may be adjusted in order to adjust a diffused concentration of the pollutant rich gas and the pollutant poor gas.

Once a pollutant rich gas is separated and outputted from a thermal diffusion structure, the pollutant rich gas may be further processed or disposed of. For example, a carbon rich gas separated by a thermal diffusion structure according to embodiments of the present disclosure may be collected to be compressed and liquified, which may then be disposed of or utilized for other purposes such as zero air synthesis.

Different types of pollutants may be separated from a combustion exhaust gas using thermal diffusion structures according to embodiments of the present disclosure, where application of a temperature gradient across the thermal diffusion structure as the combustion exhaust gas is flowed therethrough causes different components in the gas to concentrate along different regions of the temperature gradient. Once a pollutant rich gas is separated from a combustion exhaust gas, the pollutant rich gas may be disposed of or otherwise processed so as not to be released into the environment. Thus, methods and processes disclosed herein may be used to clean combustion exhaust gas, thereby reducing the amount of pollutants released into the environment from combustion.

Whereas previous methods of using thermal diffusion have been used to separate only two gas components, thermal diffusion structures according to embodiments of the present disclosure may allow for the separation of two or more (e.g., three, four, etc.) gas components. For example, thermal diffusion structures disclosed herein may be used for separation of multiple pollutant gases (e.g., $CO_2$, $NO_x$, $SO_x$, etc.) from combustion exhaust streams. Additionally, thermal diffusion structures according to embodiments of the present disclosure may utilize a plate and frame heat exchanger design, which may provide a compact and efficient method of generating thermal gradients for thermal separation through the thermal diffusion structure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system, comprising:
   a combustion engine; and
   a thermal diffusion unit fluidly connected to the combustion engine via a flue line, the thermal diffusion unit comprising:
     a plurality of plates assembled in a parallel configuration, the plurality of plates comprising:
       a pair of heating plates having a heating fluid gap extending between the pair of heating plates; and
       a pair of cooling plates having a cooling fluid gap extending between the pair of cooling plates;
     a diffusion sheet positioned between the pair of heating plates and the pair of cooling plates, wherein the diffusion sheet interfaces on a first side with one of the heating plates and interfaces on an opposite side with one of the cooling plates, and wherein the diffusion sheet comprises:
       a plurality of interconnected thermal diffusion cells arranged in a repeating pattern, wherein the thermal diffusion cells are defined by a plurality of shared walls;
       at least one heated passage fluidly connecting adjacent thermal diffusion cells; and
       at least one cooled passage fluidly connecting adjacent thermal diffusion cells.

2. The system of claim 1, wherein the thermal diffusion unit further comprises:
   a heating fluid inlet channel extending through a first end of the assembled plates;
   a heating fluid outlet channel extending through a second end of the assembled plates, wherein the heating fluid outlet channel is in fluid communication with the heating fluid inlet channel via the heating fluid gap;
   a cooling fluid inlet channel extending through the first end of the assembled plates; and
   a cooling fluid outlet channel extending through the second end of the assembled plates, wherein the cooling fluid outlet channel is in fluid communication with the cooling fluid inlet channel via the cooling fluid gap.

3. The system of claim 1, wherein the thermal diffusion unit further comprises:
   additional pairs of heating plates;
   additional pairs of cooling plates alternatingly positioned between the pairs of heating plates; and
   additional diffusion sheets alternatingly positioned between the pairs of heating plates and the pairs of cooling plates.

4. The system of claim 3, wherein an outlet end of a first of the diffusion sheets is fluidly connected to an inlet end of a second of the diffusion sheets.

5. The system of claim 1, wherein the repeating pattern of the thermal diffusion cells comprises multiple rows of thermal diffusion cells that are offset from each other, such that the heated passage of a first thermal diffusion cell in a first row fluidly connects a second thermal diffusion cell in a second row, and the cooled passage of the first thermal diffusion cell fluidly connects a third thermal diffusion cell in the second row.

6. The system of claim 1, further comprising a fluid diverter connected at an outlet end of the diffusion sheet, wherein the fluid diverter comprises:
   a first flow path fluidly connected to the heated passages of the thermal diffusion cells at the outlet end of the diffusion sheet; and
   a second flow path fluidly connected to the cooled passages of the thermal diffusion cells at the outlet end of the diffusion sheet.

7. A system, comprising:
   a combustion engine; and
   a thermal diffusion unit fluidly connected to the combustion engine via a flue line, the thermal diffusion unit comprising:
     a heating wall;
     a cooling wall;
     a plurality of thermal diffusion cells defined between the heating wall and the cooling wall;
     multiple heated passages formed through and fluidly connecting a first set of the thermal diffusion cells, wherein the heated passages are adjacent the heating wall; and
     multiple cooled passages formed through and fluidly connecting a second set of the thermal diffusion cells, wherein the cooled passages are adjacent the cooling wall;
   wherein at least one of the thermal diffusion cells in the first set is the same as at least one of the thermal diffusion cells in the second set; and
   wherein at least one of the thermal diffusion cells in the first set is separate from at least one of the thermal diffusion cells in the second set, such that a heated fluid flowing through the first set of thermal diffusion cells is separated from a cooled fluid flowing through the second set of thermal diffusion cells.

8. The system of claim 7, wherein the thermal diffusion unit further comprises:
   a second heating wall positioned parallel to and spaced apart from the heating wall, wherein a heating fluid gap is formed between the heating walls;
   a second cooling wall positioned parallel to and spaced apart from the cooling wall, wherein a cooling fluid gap is formed between the cooling walls.

9. The system of claim 8, further comprising a heating fluid line fluidly connected between a heating fluid source and the heating fluid gap, wherein a portion of the heating fluid line is adjacent to a portion of the flue line.

10. The system of claim 8, further comprising a cooling fluid line fluidly connected between a cooling fluid source and the cooling fluid gap.

11. The system of claim 7, wherein a first heated passage of a first thermal diffusion cell fluidly connects to a second thermal diffusion cell, and a first cooled passage of the first thermal diffusion cell fluidly connects to a third thermal diffusion cell.

12. The system of claim 7, further comprising at least one exhaust gas treatment system provided along the flue line.

13. The system of claim 7, further comprising a fluid diverter connected at an outlet end of the thermal diffusion unit, wherein the fluid diverter comprises:
   a first flow path fluidly connected to the heated passages of the thermal diffusion cells; and
   a second flow path fluidly connected to the cooled passages of the thermal diffusion cells.

14. A method of reducing carbon from a combustion exhaust gas, the method comprising:
   thermally diffusing the combustion exhaust gas into a carbon rich gas and a carbon poor gas, wherein thermally diffusing comprises:
      heating a heating plate interfacing a first side of a diffusion sheet in a thermal diffusion unit;
      cooling a cooling plate interfacing an opposite side of the diffusion sheet;
      directing the combustion exhaust gas through the diffusion sheet, wherein the diffusion sheet comprises multiple thermal diffusion cells that are fluidly connected via a plurality of heated passages formed adjacent to the interfacing heating plate and via a plurality of cooled passaged formed adjacent to the interfacing cooling plate:
      wherein one of the carbon rich gas or the carbon poor gas of the combustion exhaust gas flows through the heated passages, and the other of the carbon rich gas or the carbon poor gas flows through the cooled passages;
   directing the carbon rich gas from an outlet of the diffusion sheet through a first flowline; and
   directing the carbon poor gas from the outlet of the diffusion sheet through a second flowline.

15. The method of claim 14, wherein the heated passages in the thermal diffusion cells fluidly connect to different thermal diffusion cells than the cooled passages.

16. The method of claim 14, further comprising directing the carbon rich gas and the carbon poor gas to a second diffusion sheet.

17. The method of claim 14, further comprising altering a flow rate of the combustion exhaust gas through the diffusion sheet to adjust a diffused concentration of the carbon rich gas and the carbon poor gas.

18. The method of claim 14, wherein the carbon rich gas comprises carbon dioxide, the method further comprising compressing and liquifying the carbon rich gas.

19. The method of claim 14, wherein the heating plate is heated by flowing a heated fluid across a side of the heating plate opposite the diffusion sheet, and wherein the cooling plate is cooled by flowing a cooled fluid across a side of the cooling plate opposite the diffusion sheet.

20. The method of claim 19, further comprising preheating the heated fluid using the combustion exhaust gas prior to directing the combustion exhaust gas through the diffusion sheet.

* * * * *